Sept. 15, 1953
M. G. BEKKER
2,652,290
MOBILE SUPPORT
Filed April 21, 1952
5 Sheets-Sheet 1
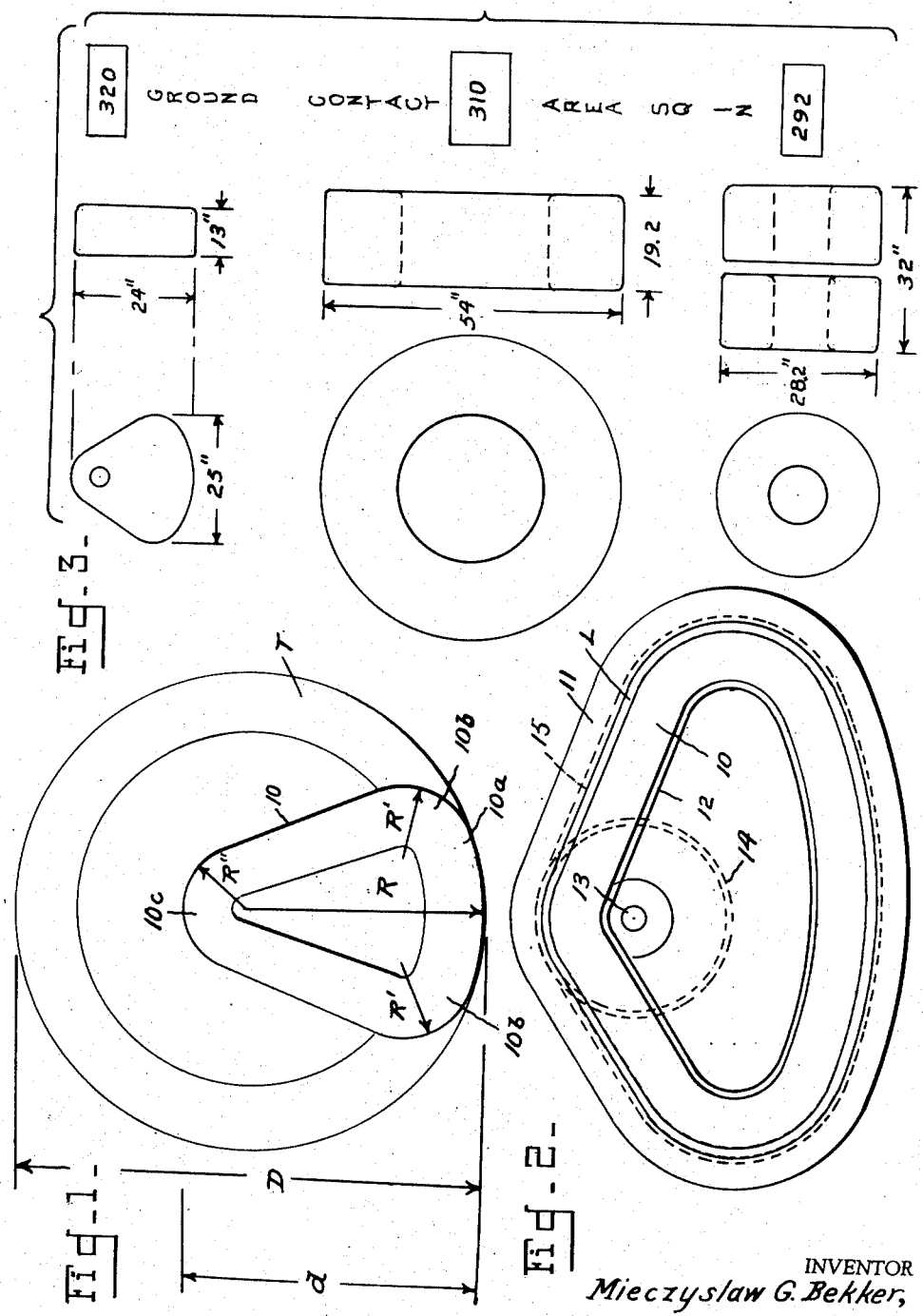
INVENTOR
Mieczyslaw G. Bekker,
BY
ATTORNEY

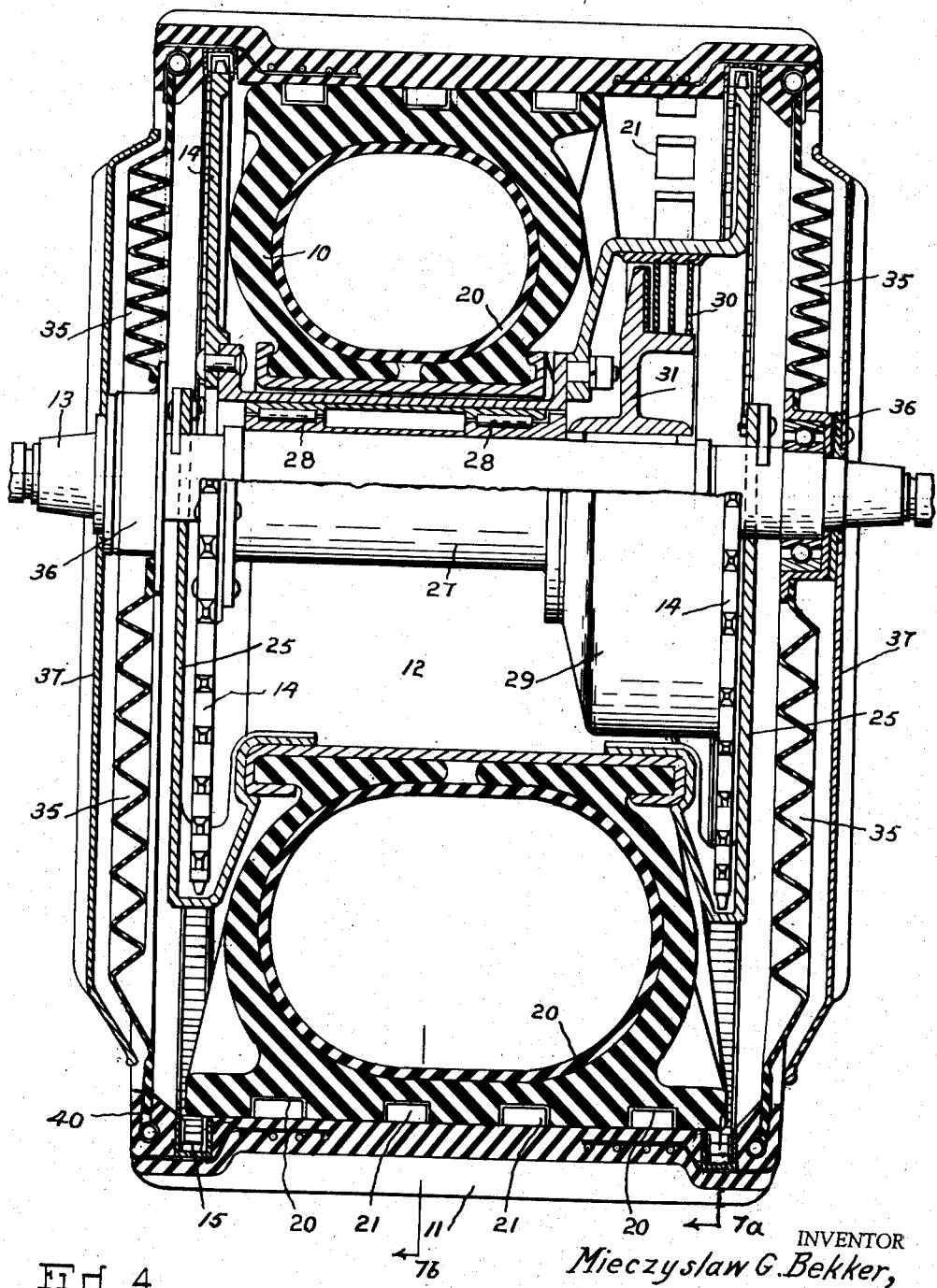

Sept. 15, 1953 M. G. BEKKER 2,652,290
MOBILE SUPPORT
Filed April 21, 1952 5 Sheets—Sheet 3

INVENTOR
Mieczyslaw G. Bekker,
BY
ATTORNEY

Sept. 15, 1953 M. G. BEKKER 2,652,290
MOBILE SUPPORT
Filed April 21, 1952 5 Sheets-Sheet 4
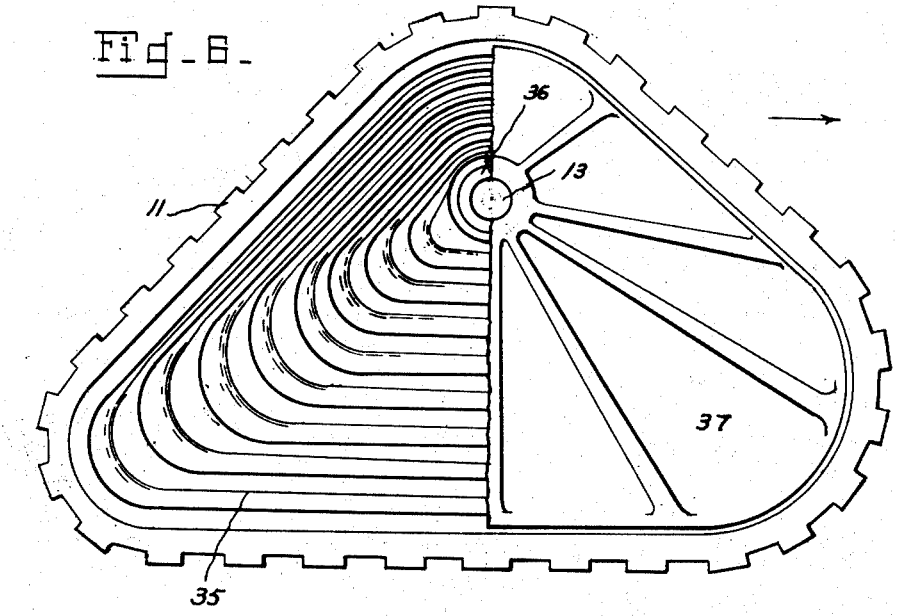
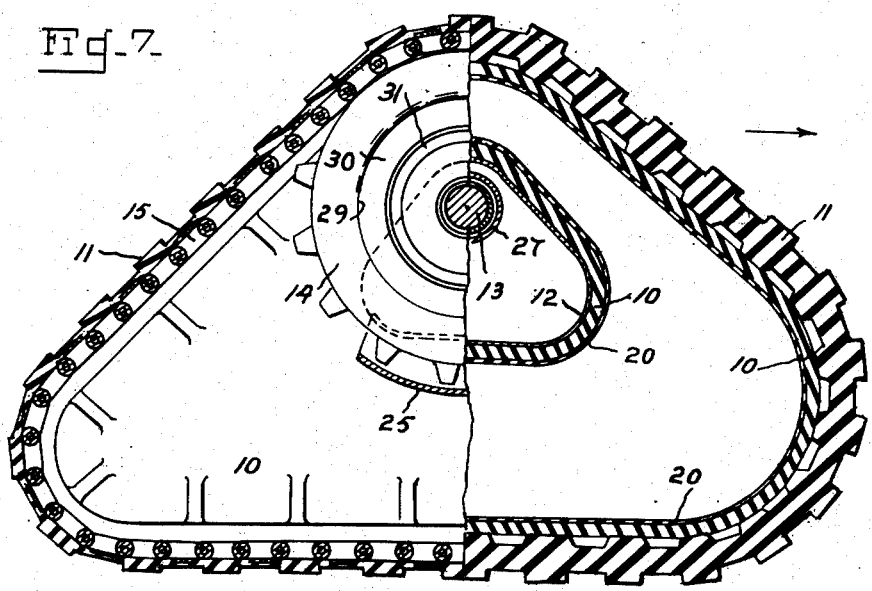
INVENTOR
Mieczyslaw G. Bekker,
BY
ATTORNEY Sept. 15, 1953 M. G. BEKKER 2,652,290
MOBILE SUPPORT
Filed April 21, 1952 5 Sheets-Sheet 5

INVENTOR
Mieczyslaw G. Bekker,
BY
ATTORNEY

Patented Sept. 15, 1953

2,652,290

UNITED STATES PATENT OFFICE 2,652,290

MOBILE SUPPORT

Mieczyslaw Gregory Bekker, Washington, D. C.

Application April 21, 1952, Serial No. 283,480

15 Claims. (Cl. 305—2)

This invention relates to mobile supports, and more particularly to such supports having lower unit loads or low ground pressure with the cushioning effect of an elastic tire and the traction effect of an endless track.

It is well known that an increase in the ground contact area of a pneumatic tire for the sake of obtaining lower unit loads may be achieved either by lowering the inflation pressure or by increasing the tire dimensions. In many cases, however, both methods have been extended to their physical limits without fully satisfying present needs. In lieu of pneumatic tires, it is a practice to substitute endless track arrangements to obtain a greater ground contact area with lower ground unit pressure and higher traction. These latter constructions, however, are large and cumbersome and are so great in weight that they are not practical in some uses, such as an aircraft, and not feasible in other uses.

Having in mind the defects of the prior art apparatus, it is an object of the present invention to provide a mobile support having lower unit load characteristics than prior supports.

It is another object of the invention to provide a mobile support having low ground pressure with a cushioning effect and high traction.

It is a further object of the invention to provide a mobile support having low ground pressure and of small compass and relatively light weight.

It is a still further object of the invention to provide a mobile support of low ground pressure having simplicity of organization, economy of construction and efficiency in operation.

The foregoing objects and others ancillary thereto are preferably accomplished in accordance with a preferred embodiment of the present invention by a support comprising a combination of a track trained about a pneumatic tire which has the general configuration of a triangle and is mounted on a shaft adjacent its upper apex with drive means or brake means between the shaft and the track at the upper apex only. The tire is shaped in its lower portion so as to substantially conform to a relatively huge tire, but by means of its generally triangular shape, has a much smaller overall diameter, compass and weight. Preferably, the tire is transversally wider at the bottom to provide greater contact area and transversally narrower at the top to accommodate within the width of the track the drive or brake mechanism between the shaft and the track. The sides of the track are enclosed by a flexible diaphragm to retain lubricant between the tire and the track.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

Figure 1 is a diagrammatic view illustrating the general configuration and theory of a triangular wheel mobile support in accordance with the present invention relative to a standard wheel or tire of substantially equal ground contact area.

Figure 2 is a diagrammatic cross sectional view through a triangular wheel of asymmetrical configuration.

Figure 3 is a chart or diagram illustrating the comparative dimensions and ground contact area between a triangular wheel in accordance with the present invention and regular tire arrangements.

Figure 4 is a cross sectional view taken vertically through and along the axis of a triangular wheel of the present invention and illustrating a preferred embodiment of the specific construction of a non-drive wheel for towing purposes.

Figure 6 is a side view in elevation of the triangular wheel shown in Figure 4.

Figure 7 is a compound cross sectional view corresponding to line 7a of Figure 4 on the left side and to line 7b of Figure 4 on the right side.

Figure 5:
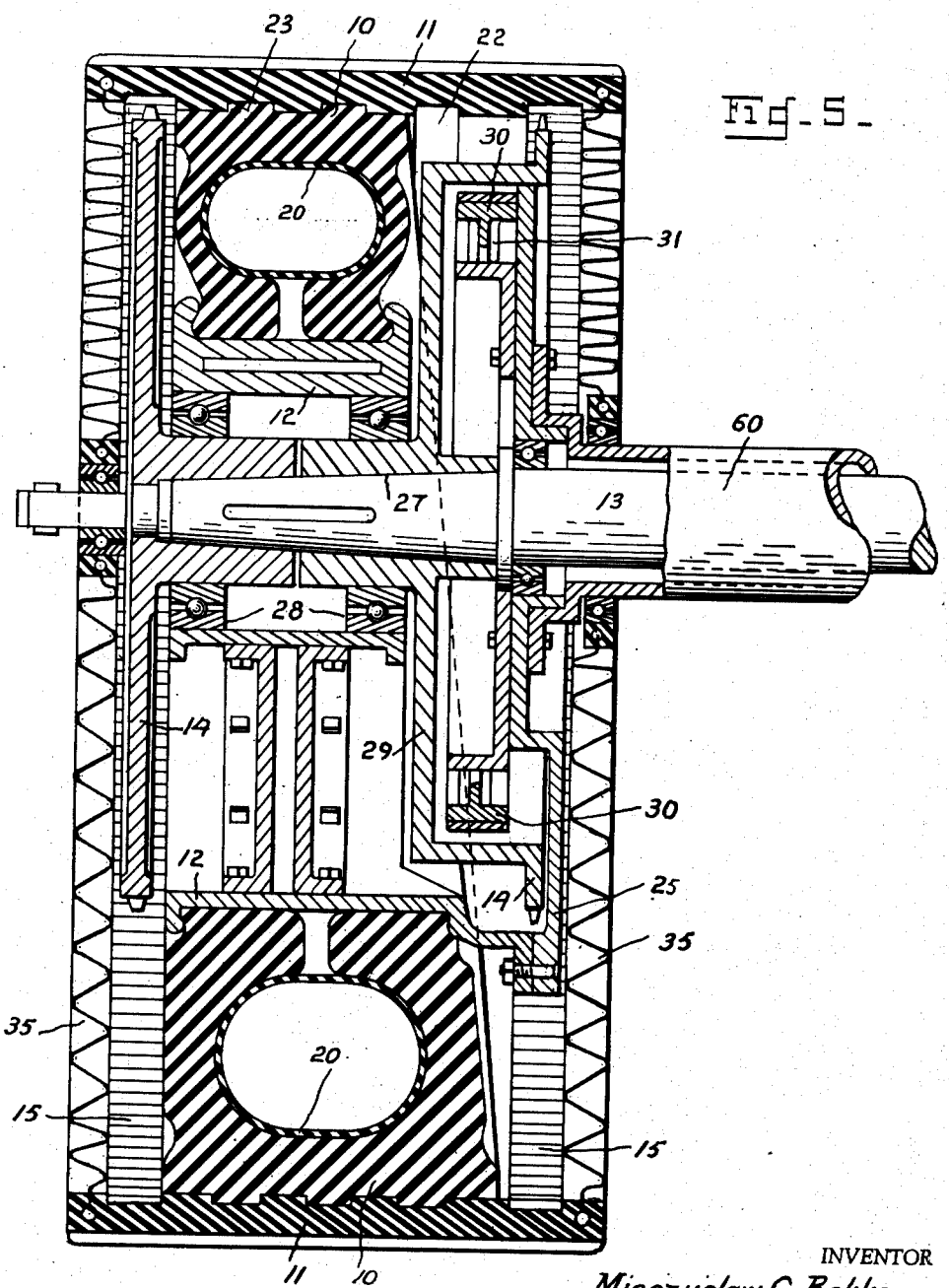
Figure 5 is a cross sectional view similar to Figure 4 but illustrating a drive wheel construction.

A lubricated skid type track gear is disclosed in application, Serial No. 155,873 filed April 14, 1950. This application discloses a track trained about an elongated tire-like cushion, the sides of the track being enclosed by flexible diaphragms to contain lubricant for lubricating the relatively movable surfaces of the track and the cushion. In principle, this construction may be considered as a flexible wheel gear, the hub of which is so enlarged that the rotating portion, that is, the track, forms a thin ring, and the stationary portion, including the tire-like rim, forms a very large bearing.

The present invention is somewhat analogous if the said track gear is developed so that its configuration becomes more round instead of oblong and the tire-like cushion is extended completely around the gear so that it becomes the sole support for the track. By this arrangement, the gear then becomes more equivalent to a wheel which may have various radii of curvature to reduce the compass and weight as well as the cost while substantially increasing the performance of the gear.

Referring now to the drawings, specifically to Figure 1, a wheel gear in accordance with the present invention may comprise a pneumatic tire-like cushion 10 of generally triangular configuration with the lower portion 10a having a radius R which is equivalent to that of a normal tire T having a diameter D, the side or lower apexes 10b of the tire 10 having a radius R', and the upper side or apex 10c of the tire 10 has a maximum radius of R", then the tire 10 has a maximum diameter or height d and thereby in effect reduces the height of the tire T from the total height D to the much smaller height d.

To provide the triangular tire 10 with mobility, a track 11 is trained therearound, as diagrammatically illustrated in Figure 2, the friction between the rubbing surfaces of the tire 10 and track 11 being relieved by a film of lubricant L which is retained within the track by flexible diaphragm like sides. The tire 10 is mounted on a rim 12 which in turn supports the wheel shaft 13, and a sprocket 14 mounted on the shaft 13 meshes with a rack 15 fixed to the track 11. In a drive gear, the shaft 13 is driven and the sprocket 14 fixed thereon and the shaft provided with a brake mechanism, whereas in a towed gear, the shaft 13 may be fixed and the sprocket 14 journalled thereon and connected therewith by a brake mechanism. Thus, the action and efficiency of a giant wheel having a diameter D is obtained, while the weight and over-all height of the gear is greatly reduced to the dimension d.

To graphically illustrate the relative dimensions and efficiency of a triangular wheel in accordance with the present invention and standard or conventional wheels, reference is made to the diagram of Figure 3. The lower unit of Figure 3 represents conventional dual wheels of standard size which have a diameter of approximately 28 inches and a width of 2 x 16 inches. Such dual wheels have a ground contact area of about 292 square inches. The intermediate unit of Figure 3 represents a standard airplane tire of 54 inches in diameter and 19.2 inches in width and having a ground contact area of about 310 square inches. The upper unit of Figure 3 represents a triangular wheel according to the present invention, wherein a height of about 24 inches and a length of about 25 inches provides a ground contact area of about 320 square inches. Thus, it will be seen that a triangular wheel of much smaller dimensions will provide a much greater ground contact area.

Obviously, the triangular wheel may vary in conformation to suit various purposes. It may be substantially symmetrical, as indicated in Figures 1 and 3, or it may be asymmetrical, as shown in Figure 2. Moreover, the ground contacting side may be arcuate or otherwise curved, as shown in Figures 1-3, or it may be substantially flat, as shown in Figures 6 and 7. In addition, the lower or side angles or apices may have uniform radii R', as shown in Figure 1, or they may have different radii r' and r", as shown in Figures 6 and 7, the radius r' of the leading angle in the direction of travel, as indicated by the arrow A, being greater than the radius r" of the trailing angle to provide greater climbing ability in the forward direction.

A specific construction for a non-driven or tow gear will now be described, reference being made to Figures 4, 6, 7 and 8. According to this construction, the shaft 13 may be mounted in non-rotary relation and may support the usual leaf springs S (Figure 8) or any other suitable and desired type of gear. The track 11 has a rack 15 adjacent each side and a pair of sprockets 14 respectively mesh with said racks so that the track 11 has a uniform tension on both sides.

Figure 8:
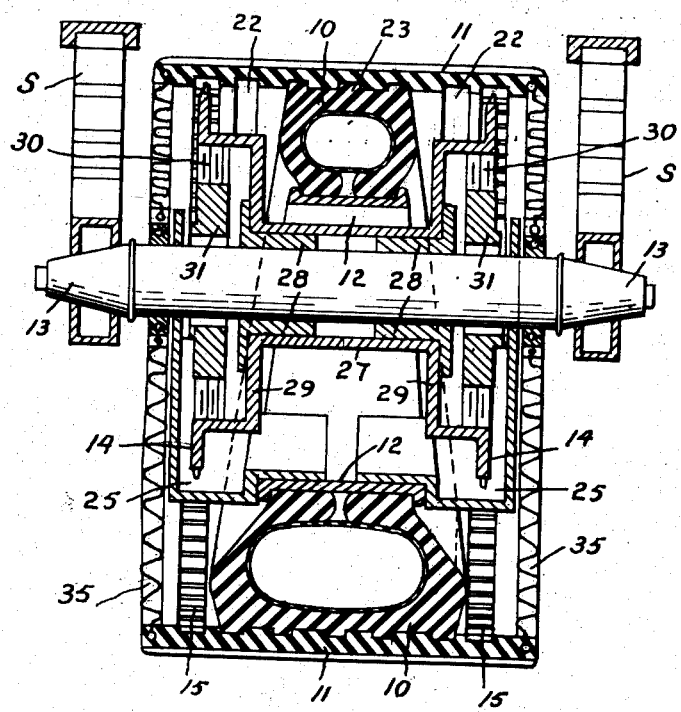
Figure 8 is a somewhat diagrammatic cross sectional view of a structure similar to Figure 4 but showing a modified structure.

The track 11 is trained about the tire 10 and is guided in relation thereto by circumferential interengaging grooves and ribs. As shown in Figures 4 and 7, the tire 10 has circumferential grooves 20, and the track has rib-like aligned lugs 21 which respectively fit said grooves in sliding relation. Conversely, as shown in Figure 8, the track may have grooves 22 which receive ribs 23 on the tire 10. It will be noted that the tire 10 is preferably narrower at the top than at the bottom, but that the respective ribs and grooves are parallel circumferentially and do not converge with the narrow tire portion.

The tire 10 may be mounted on the rim 12 in the usual manner, and the rim 12 has rigidly connected arms 25 which respectively extend around the lower circumferences of the sprockets 14 and upwardly outside said sprockets to support the shaft 13. The sprockets 14 are carried by a hub assembly 27 which is journalled on the shaft 13 by bearings 28. As previously stated, the tire 10 is preferably narrower at the top and the bottom is substantially the full width of the track to provide a firm support. The narrowing of the tire at the top accommodates the incorporation with one of the sprockets 14 of a brake drum 29 (Figure 4) or both sprockets may have such drums 29 (Figure 8) within the lateral limits of the track 11. The drums 29 are provided internally with brake means 30 which are cooperative with a brake device 31 that is keyed to the shaft 13. Obviously, the structure may be modified so that the shaft may be driven and the brake means 30 and device 31 may function as a clutch.

In order to reduce the friction between the track 11 and the tire 10, the rubbing surfaces may be well lubricated. To retain an ample supply of lubricant within the track 11, elastic diaphragm like sides 35 are secured at their outer edges to the side portions of the track 11 and are rotatably mounted by sealed bearings 36 around the shaft 13 at their inner edges. The sides 35 are preferably pleated to permit the necessary expansion and contraction without strain as the track moves about the triangular tire 10 and the sides revolve about the shaft 13.

These sides completely enclose the interior of the track, the tire, the sprockets and their mountings, and the brake or clutch mechanism. If the shaft 13 is stationary, diaphragm protecting shields 37 may be mounted on the shaft and immediately adjacent the outer sides of said diaphragm sides 35. These shields 37 may comprise armour plates or may merely protect the diaphragms from accidental rupture.

Figure 9:
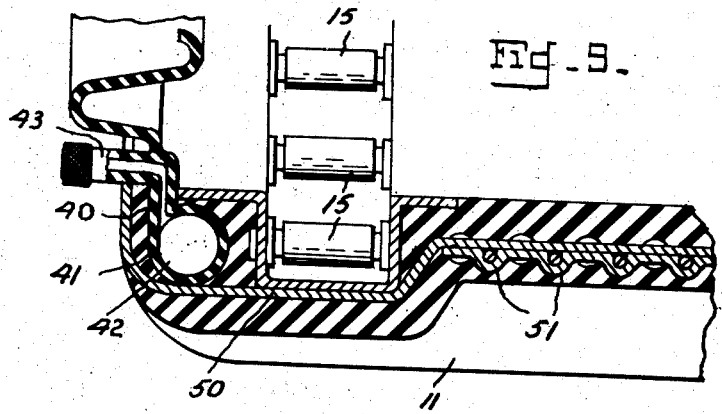
Figure 9 is an enlarged fragmentary cross sectional view taken through the sealing joint between the flexible side and the track.

As previously stated, the outer edges of the sides 35 are secured to the side edge portions of the track 11. This joint must be a sealed joint to retain the lubricant and is preferably a releasable joint to permit access to the interior. To provide such a joint, the track 11 has a slot-like groove 40 opening into an enlarged internal channel 41 extending around the side edge portions of the track. The outer edges of the diaphragms 35 comprise expandable and collapsible tubes 42 which are preferably endless and are insertable in collapsed condition into the channels 41 and then expand pneumatically for example to fit tightly in the channels. Preferably as shown in Figure 9, each tube is provided with a valved neck 43, such as those on inner tubes for inflation and deflation purposes.

In order to strengthen the side edges of the track 11, which may be rubber, metal strips 50 may be embedded in the track on each side of the channel 41 and slot 40. The strips 50 extend transversely of the track and spaced around the circumference of the track. The strips 50 also provide an anchorage for the racks 15 which conveniently may comprise roller chains. At their inner end portions, the strips 50 are connected with and tie together a plurality of reinforcing hoops 51 of wire or the like that are embedded circumferentially in the track 11.

As previously stated, the triangular wheel of the present invention is readily adaptable for a driving unit as well as a towed unit, and a suitable structure for a driving unit is shown in Figure 5. The structure is quite similar to that previously described except that the sprockets 14 are keyed to the shaft, and their hub assembly 27 may conveniently be journalled within the rim 12 by the bearings 28. The shaft 13 may be driven as from a differential, which is not shown, and enclosed within the usual housing 60 extending from the differential. To prevent a tendency of the rim 12 to rotate, it may have but a single arm 25 which is connected to the housing 60. Conveniently, the brake device 31 is carried by this arm 25, but in any event, is connected with the housing 60 to be stationary relative to the brake means 30.

Although certain specific embodiments have been shown and described, it is obvious that many modifications thereof are possible. The invention, therefore, is not to be restricted except insofar as is necessitated by the prior art and by the spirit of the appended claims.

What I claim is:

1. A tracked gear, comprising support means for supporting a load, an elastic member of endless angular configuration stationarily surrounding and supporting said support means, a track movably trained around said elastic member for ground contact, and flexible sides sealed to each side of said track and movably surrounding and sealed with said support means on opposite sides of said member to retain lubricant within said track for lubricating the relatively movable surfaces of said track and said elastic member.

2. A tracked gear, as defined in claim 1, wherein the angles of said elastic member are curved and the leading bottom angle has a larger radius of curvature than the trailing bottom angle.

3. A tracked gear, as defined in claim 1, wherein said elastic member is wider at the bottom than at the top.

4. A tracked gear, as defined in claim 1, wherein said elastic member is deeper at the bottom than at the top.

5. A tracked gear, as defined in claim 1, wherein said elastic member comprises a tire.

6. A tracked gear, as defined in claim 1, comprising clutch means between said support means and said track.

7. A tracked gear, as defined in claim 1, comprising brake means between said support means and said track.

8. A tracked gear, as defined in claim 1, wherein said support means comprises a shaft and said elastic member is of triangular configuration, the upper angle of said elastic means being curved concentrically relative to said shaft.

9. A tracked gear, as defined in claim 1, wherein said support means comprises a shaft, said elastic member being of triangular configuration, the upper angle and the bottom side of said elastic member being respectively curved concentrically relative to said shaft.

10. A tracked gear, as defined in claim 1, wherein the mutually engaging surfaces of said elastic member and said track are provided with sets of mating grooves and ribs, one set of said ribs comprising aligned lugs to provide lubricant containing spaces.

11. A tracked gear, comprising support means including a shaft and a non-rotatable rim of triangular configuration surrounding said shaft and means supporting said shaft adjacent the upper angle of said rim, a tire of triangular configuration mounted on said rim, the outer surfaces of the angles of said tire being curved with the surface of the upper angle concentric with said shaft, a track movably trained around said tire, a rack on the inner side of said track and laterally of the upper portion of said tire, a gear rotatable about the axis of said shaft and in mesh with the upper portion of said rack extending around the upper angle of said tire, means between said support means and said gear for releasably connecting said gear and said support means, and flexible sides sealed at their outer edges to the side portions of said track and surrounding said shaft in sealed relation to enclose said tire, support means, gear and connecting means and to retain lubricant within said track for lubricating the relatively movable surfaces of said track and said tire.

12. A tracked gear, as defined in claim 11, wherein said seal between said sides and said track comprises a channel recessed in the side edge portion of said track, an inflatable tube fixed around the periphery of the side and removably sealable in said channel when deflated, and valve means connected with said tube for inflating said tube after it is seated in said channel to seal said tube in said channel.

13. A tracked gear, as defined in claim 12, wherein said track is reinforced by rigid strips embedded in the edge portions thereof on both sides of said channels.

14. A tracked gear, as defined in claim 13, wherein said strips extend transversely of said track and are spaced circumferentially around said track, a plurality of hoops embedded in said track circumferentially, and means connecting said hoops and said strips.

15. A tracked gear, as defined in claim 11, wherein said shaft is journalled in said rim and means, a fixed housing surrounding said shaft, and an arm fixed between said rim and said housing.

MIECZYSLAW GREGORY BEKKER.

No references cited.